(12) United States Patent  
Dybsetter et al.

(10) Patent No.: US 8,667,194 B2  
(45) Date of Patent: Mar. 4, 2014

(54) TWO-WIRE INTERFACE IN WHICH A MASTER COMPONENT MONITORS THE DATA LINE DURING THE PREAMBLE GENERATION PHASE FOR SYNCHRONIZATION WITH ONE OR MORE SLAVE COMPONENTS

(75) Inventors: Gerald L. Dybsetter, Scotts Valley, CA (US); Jayne C. Hahin, Cupertino, CA (US)

(73) Assignee: Finisar Corporation, Sunnyvale, CA (US)

( * ) Notice: Subject to any disclaimer, the term of this patent is extended or adjusted under 35 U.S.C. 154(b) by 800 days.

(21) Appl. No.: 10/814,483

(22) Filed: Mar. 31, 2004

(65) Prior Publication Data

US 2005/0128962 A1 Jun. 16, 2005

Related U.S. Application Data

(60) Provisional application No. 60/530,052, filed on Dec. 15, 2003.

(51) Int. Cl.
 *G06F 13/00* (2006.01)

(52) U.S. Cl.
 USPC ............................................ 710/110; 710/105

(58) Field of Classification Search
 USPC ......................... 710/104, 105, 110
 See application file for complete search history.

(56) References Cited

U.S. PATENT DOCUMENTS

| | | | |
|---|---|---|---|
| 4,409,592 A | | 10/1983 | Hunt |
| 4,495,572 A | * | 1/1985 | Bosen ........................... 709/250 |
| 4,564,838 A | * | 1/1986 | Boulogne et al. ............. 370/462 |
| 4,642,630 A | * | 2/1987 | Beckner et al. ............... 710/240 |
| 4,689,740 A | | 8/1987 | Moelands et al. |
| 4,706,082 A | * | 11/1987 | Miesterfeld et al. .......... 710/240 |
| 4,713,808 A | | 12/1987 | Gaskill et al. |
| 5,367,695 A | | 11/1994 | Narad et al. |
| 5,410,542 A | * | 4/1995 | Gerbehy et al. ............... 370/364 |
| 5,559,502 A | | 9/1996 | Schutte |
| 5,632,016 A | | 5/1997 | Hoch et al. |

(Continued)

FOREIGN PATENT DOCUMENTS

| | | |
|---|---|---|
| EP | 705012 A2 | 4/1996 |
| FR | 2695782 A1 | 3/1994 |
| KR | 2007054063 | 5/2007 |

OTHER PUBLICATIONS

Microsoft Computer Dictionary, Fifth Edition, 2002, pp. 15, 133.*

(Continued)

*Primary Examiner* — Nimesh G Patel
(74) *Attorney, Agent, or Firm* — Maschoff Brennan

(57) ABSTRACT

A two-wire interface in which upon determining that an operation is to be performed on a slave component, the master component monitors the data wire for a predetermined number of consecutive bits having a particular binary value. Upon detection such a sequence, the master component asserts a frame of a two-wire interface on the data wire. This detected predetermined number of consecutive bits will be considered to be the preamble. During at least some of the preamble phase, the master component is not asserting anything on the data wire. Instead, the data wire is pulled high (or low) by a weak pull-up (or pull-down) resistor. Furthermore, the frame is designed so that there are bits having a guaranteed binary value that is opposite what would be expected in the preamble, to thereby facilitate synchronization.

41 Claims, 7 Drawing Sheets

(56) References Cited

U.S. PATENT DOCUMENTS

| | | | |
|---|---|---|---|
| 5,675,617 A * | 10/1997 | Quirk et al. | 375/365 |
| 5,935,224 A | 8/1999 | Svancarek et al. | |
| 5,946,462 A * | 8/1999 | Rangan et al. | 714/49 |
| 6,065,087 A | 5/2000 | Keaveny et al. | |
| 6,081,523 A * | 6/2000 | Merchant et al. | 370/389 |
| 6,085,258 A * | 7/2000 | Dreyer et al. | 710/5 |
| 6,115,429 A * | 9/2000 | Huang | 375/317 |
| 6,185,620 B1 | 2/2001 | Weber et al. | |
| 6,215,816 B1 * | 4/2001 | Gillespie et al. | 375/219 |
| 6,350,063 B1 | 2/2002 | Gilliland et al. | |
| 6,385,669 B1 * | 5/2002 | Creedon et al. | 710/19 |
| 6,463,499 B1 | 10/2002 | Wakeley et al. | |
| 6,512,617 B1 | 1/2003 | Tanji et al. | |
| 6,643,843 B1 | 11/2003 | Reger | |
| 6,647,528 B1 | 11/2003 | Collette et al. | |
| 6,715,094 B2 | 3/2004 | Jacobs | |
| 6,738,856 B1 | 5/2004 | Milley et al. | |
| 6,804,776 B1 | 10/2004 | Lothberg et al. | |
| 6,826,658 B1 | 11/2004 | Gaither et al. | |
| 6,859,465 B1 | 2/2005 | Colban | |
| 6,882,711 B1 | 4/2005 | Nicol | |
| 6,912,361 B2 | 6/2005 | Aronson et al. | |
| 6,937,571 B1 * | 8/2005 | Acharya et al. | 370/246 |
| 7,039,770 B1 | 5/2006 | Chen et al. | |
| 7,096,310 B2 | 8/2006 | Norden | |
| 7,167,654 B2 | 1/2007 | Tokita et al. | |
| 7,225,282 B1 | 5/2007 | Lyle | |
| 7,240,347 B1 | 7/2007 | Lim et al. | |
| 7,430,259 B2 | 9/2008 | North et al. | |
| 7,437,078 B2 | 10/2008 | Hofmeister et al. | |
| 7,545,256 B2 * | 6/2009 | O'Toole et al. | 340/10.2 |
| 7,765,348 B2 | 7/2010 | Dybsetter et al. | |
| 7,814,283 B1 | 10/2010 | Chen et al. | |
| 2002/0029233 A1 * | 3/2002 | Kitamura | 708/212 |
| 2002/0045519 A1 | 4/2002 | Watterson et al. | |
| 2002/0073257 A1 | 6/2002 | Beukema et al. | |
| 2002/0087751 A1 | 7/2002 | Chong | |
| 2002/0120795 A1 * | 8/2002 | Charlier | 710/33 |
| 2002/0149821 A1 | 10/2002 | Aronson et al. | |
| 2002/0181415 A1 | 12/2002 | West et al. | |
| 2002/0184385 A1 | 12/2002 | Kato | |
| 2003/0018839 A1 | 1/2003 | Ishida | |
| 2003/0025587 A1 * | 2/2003 | Whitney et al. | 338/22 R |
| 2003/0074488 A1 | 4/2003 | Griego et al. | |
| 2003/0113118 A1 | 6/2003 | Bartur | |
| 2003/0229748 A1 | 12/2003 | Brewer et al. | |
| 2004/0028412 A1 | 2/2004 | Murphy | |
| 2004/0059852 A1 | 3/2004 | Sun et al. | |
| 2004/0136708 A1 | 7/2004 | Woolf et al. | |
| 2004/0136720 A1 | 7/2004 | Mahowald et al. | |
| 2004/0136722 A1 | 7/2004 | Mahowald et al. | |
| 2004/0139244 A1 | 7/2004 | Hufferd | |
| 2004/0161069 A1 * | 8/2004 | Eom | 375/369 |
| 2004/0260842 A1 | 12/2004 | Pettey et al. | |
| 2005/0015525 A1 | 1/2005 | Cahill et al. | |
| 2005/0021874 A1 | 1/2005 | Georgiou et al. | |
| 2005/0091438 A1 | 4/2005 | Chatterjee | |
| 2005/0111845 A1 * | 5/2005 | Nelson et al. | 398/138 |
| 2005/0163168 A1 | 7/2005 | Sheth et al. | |
| 2005/0191059 A1 | 9/2005 | Swenson et al. | |
| 2005/0232367 A1 | 10/2005 | North et al. | |
| 2005/0244163 A1 | 11/2005 | Hofmeister et al. | |
| 2007/0150629 A1 | 6/2007 | Lyle | |
| 2008/0144647 A1 | 6/2008 | Lyle | |
| 2009/0300232 A1 | 12/2009 | Chen | |

OTHER PUBLICATIONS

IEEE Standard 802.3, 2005, Section 45.1.*
Definition of "bit stuffing" retrieved from http://www.webopedia.com/term/b/bit_stuffing.html.*
U.S. Appl. No. 11/074,608, filed Jul. 15, 2010, Final Office Action.
XFP (10 Gigabit Small Form Factor Pluggable Module, Revision 1.0, copyright 2002. By XFP MSA.
Universal Serial Bus Specification, Revision 2.0, Apr. 27, 2000, pp. 39, 57-58, 62, 1952-197, 306-307.
Bit-banging' from Wikipedia, the free encyclopedia, at http://en.wikipedia.org/wiki/Bit_banging.
The 12C-Bus Specification Version 2.1 by Philips Semiconductors, Jan. 2000.
Data Encapsulation & Decapsulation in the OSI Model' by Firewall.cx at http://www.firewall.cx/osi-encap-decap.php, originally posted on Jan. 28, 2003.
Proposed Specification for GBIC (Gigabit Interface Converter) Rev 5.5, technical editor Robert Snively, Sep. 27, 2000.
Versatile, Unique USB-to-12C Adapter for PCs' from ThomasNet Industrial NewsRoom, Jun. 2, 2003.
Finisar Product Specification 1000BASE-T Copper GBIC Transceivers FCM-8520/8521-3, Rev A, Feb. 2003.
"Introduction to I2C" www.embedded.com/story/OEG20010718S0073 by David 0 DKalinsky and Roee Kalinsky, Jul. 31, 2001.
DevaSys USB 12C/10 P.C.B. at www.devasys.com/usbi2cio.htm from Dec. 2003.
U.S. Appl. No. 11/074,901, filed Jul. 31, 2007, Office Action.
U.S. Appl. No. 11/074,901, filed Mar. 7, 2008, Office Action.
U.S. Appl. No. 11/074,901, filed Sep. 15, 2008, Office Action.
U.S. Appl. No. 11/074,901, filed Jan. 19, 2010, Office Action.
U.S. Appl. No. 11/074,901, filed Mar. 12, 2010, Notice of Allowance.
U.S. Appl. No. 11/074,608, filed Oct. 19, 2007, Office Action.
U.S. Appl. No. 11/074,608, filed Jul. 9, 2008, Office Action.
U.S. Appl. No. 11/074,608, filed Jan. 12, 2009, Office Action.
U.S. Appl. No. 11/074,608, filed Oct. 7, 2009, Office Action.
U.S. Appl. No. 11/074,608, filed Feb. 23, 2010, Office Action.
U.S. Appl. No. 11/074,608, filed Dec. 6, 2010, Office Action.
U.S. Appl. No. 11/074,608, filed Jul. 18, 2011, Office Action.
U.S. Appl. No. 11/074,608, filed Nov. 7, 2011, Office Action.
'Finisar Product Specification 1000BASE-T Copper GBIC Transceivers FCM-8520/8521-3' Rev A, copyright Finisar Corporation, Feb. 2003.
U.S. Appl. No. 11/074,608, filed Mar. 14, 2012, Notice of Allowance.

* cited by examiner

```
                                                (TA)                                  (SLAV-STUS)
     H                                           BH                   Z1   Z2         BT2 Z3    SP
     SR       OP   DEV   ADDR            BT1 DATA_H    DATA_L   CRC    ACK E
  PRE 5 44    444  444   444             333  3322    2222     111    0000 0000
  65 10 98    754  421   421             432  4321    4321     543    6543 3210
  ---------------------------------------------------------   -------  ------------
RD: H...H 1 00 100  VVV  AAAAAAA         Z B  DDDDDDD  DDDDDDD 0 CCCCCCC 0100 1Z  ←301B
moe: . : . *** ***  ***  *******         . .  *******  ******* . ******* .*.* .*
soe: . : . ... ...  ...  .......         . .  .......  ....... . ....... .... ..
   --                                    --                                     --
WR: H...H 1 00 000  VVV  AAAAAAA         0 1  DDDDDDD  DDDDDDD 0 CCCCCCC Z100 1Z  ←304B
moe: . : . *** ***  ***  *******         . *  *******  ******* . ******* .*.* .*
soe: . : . ... ...  ...  .......         . .  .......  ....... . ....... .... ..

--       --- ---  ---  -------         --- *******  ******* * ******* .*.* .*
crc_gen:  .: .  ***  ***  *******         ..  *******  ******* * *******
crc_chk:  .: .  ***  ***  *******         ..  *******  ******* * *******

<--|   (restart if input not all 1's)
   +---+
```

Fig. 3B

```
          H       OP                    BH
    PRE   SR     DEV    ADDR       BT1 DATA_H    Z1 DATA_L   Z2 SP
    5 3   3 3 3  3 3 3  2 2        2 2 2 1       1 1 1       0 0 0 0
    5 9   8 7 6  5 3 2  2 1 0 9    2 1 0 9       2 1 0       3 2 1 0
    |---| |---|  |---|  |---------||---|-------| |-|-------| |-|--|
RD: H...H 1 0 0  1 1 0  VVV AAAAAAAA Z B DDDDDDDD 0 DDDDDDDD 0 1Z
moe: *     * * *  * * *  *** ********  * * ********  * ********  * *.
soe: .     . . .  . . .  ... ........  . . ........  . ........  . ..

|---| |---|  |---|  |---------||---|-------| |-|-------| |-|--|
WR: H...H 1 0 0  0 1 0  VVV AAAAAAAA 0 1 DDDDDDDD 0 DDDDDDDD 0 1Z
moe: *     * * *  * * *  *** ********  * * ********  * ********  * *.
soe: .     . . .  . . .  ... ........  . . ........  . ........  . ..

|---|
    | <-| (restart if input not all 1's)
    +---+
```

```
            PRE       ST OP PRT   DEV     TA ADDRESS/DATA           IDLE
            6         3  3  2     2       1  1 1                    0 0
            4         3  21 09  8 4 3     9  87 6                   1 0

Address     1....1    00 00 PPPPP EEEEE   10 AAAAAAAAAAAAAAAA       Z
Write       1....1    00 01 PPPPP EEEEE   10 DDDDDDDDDDDDDDDD       Z
Read        1....1    00 11 PPPPP EEEEE   Z0 DDDDDDDDDDDDDDDD       Z
Read inc.   1....1    00 10 PPPPP EEEEE   Z0 DDDDDDDDDDDDDDDD       Z Field       Bits PRE         64:33   (32)  -- preamble
ST          32:31   (2)   -- start of frame
OP          30:29   (2)   -- operation code
(ADDR=00,WR=01,RD=11,RDINC=10)
PRTAD       28:26   (5)   -- port address
DEVAD       25:19   (5)   -- device address
TA          18:17   (2)   -- bus turnaround phase & transfer acknowledge
ADDR/DATA   16:1    (16)  -- address or data
IDLE        0       (1)   -- end of transmission
            ----
            65            -- transaction bit length
```

*Fig. 7*
*(Prior Art)*

TWO-WIRE INTERFACE IN WHICH A MASTER COMPONENT MONITORS THE DATA LINE DURING THE PREAMBLE GENERATION PHASE FOR SYNCHRONIZATION WITH ONE OR MORE SLAVE COMPONENTS

CROSS-REFERENCE TO RELATED APPLICATIONS

This application claims the benefit of U.S. Provisional Application No. 60/530,052 filed Dec. 15, 2003, which is incorporated herein by reference in its entirety.

BACKGROUND OF THE INVENTION

1. The Field of the Invention

The present invention relates generally to mechanisms for two or more components to communicate using a two-wire interface. More specifically, the present invention relates to a two-wire interface in which a master component monitors the data line during the preamble generation phase for synchronization with one or more slave components.

2. Background and Relevant Art

Electronic and computing technology has transformed the way that we work and play. Many electronic or computing systems rely on a variety of components that cooperatively interact to perform complex functions. Such cooperative interaction often relies on the ability of the various components to communicate effectively.

There are many ways that electronic components may communicate. However, oftentimes a two-wire interface is used to communicate between components. Although communication using a two-wire interface can be slower than communication over other interfaces, the use of two-wire interfaces is preferred in some implementations because such interfaces often require less chip or board space between components. In addition, two-wire interfaces often introduce less electromagnetic interference in the rest of the chip and/or board than many parallel interfaces.

In some conventional two-wire interfaces, one wire is used to carry a clock signal, and one wire is used to carry a data signal. The clock signal is generally generated by a master component and is used by the master component as well as by one or more slave components. Either the master component or a slave component may drive data onto the data wire following the timing of the shared clock signal. Each communicating component understands a common two-wire protocol used to communicate, and thus may each function appropriately given the data. The data line for two-wire interfaces typically includes not only data, but also a header field that identifies the operations to be performed (i.e., the operation code), the device identifier (in cases in which there may be multiple slave components to communicate with), and an address from which the data should be read or to which the data should be written.

One example of a prolific two-wire interface is the I²C interface. The I²C interface may be used to transfer large amounts (e.g., kilobytes or megabytes) of data using a single corresponding header field. In other words, the header field is provided once, and the corresponding operation is understood to correspond to all of the data to follow. Since the header field is provided only once for large amounts of data, the I²C interface is very efficient when communicating large amounts of data to and from memory.

Another kind of two-wire interface includes a header field for each byte or word of data being transferred. Such two-wire interface will be referred to as a "guaranteed header two-wire interface" since each byte or word or other small fixed amount of data is guaranteed to have its own header field identifying the operation to be performed. Since each byte or word of data has its own header field, there is significantly more bandwidth used per unit of data transferred. Most often, in fact, there are more bits transferred that represent header information than there are that represent actual data to be read or written when using such guaranteed header interfaces. Accordingly, guaranteed header two-wire interfaces are not typically used for reading or writing large amounts of contiguous data. Instead, guaranteed header two wire interfaces are most often used for intermittently transferring small amounts of data as when, for example, occasionally setting configuration register values.

A frame of one conventional guaranteed header two-wire interface is illustrated in FIG. 7 and is often referred to as the "MDIO" interface. In this description and in the claims, a "frame" of a guaranteed header two-wire interface is defined as that the structural information used to transfer the corresponding one byte or word of data.

The master component begins the frame by affirmatively asserting a preamble on the data wire. The preamble includes 32 bits, each having a logical one (corresponding to bits 64:33). This preamble gives an indication to each of the one or more slave components that the other header information and data is about to be transmitted.

The master component then transmits the next two bits (corresponding to bits 32:31) have a logical zero to represent the start of the frame. This conveys that the more meaningful data is about to be transmitted.

In particular, after the start of frame bits, the master component transmits the operation code (corresponding to bits 30:29). Under the MDIO standard, an address operation corresponds to operation bit values of 00, a write operation corresponds to operation bit values of 01, a read operation corresponds to operation bit values of 11, and a read increment operation corresponds to operation bit values of 10.

The master component then transmits the port address (corresponding to bits 28:24). This identifies the slave port that is to be communicated with. Under the MDIO standard, more than one slave component may correspond to a single port. Accordingly, to uniquely identify the slave component to be communicated with, the master component then transmits a device identifier (corresponding to bits 23:19), to thereby allow that slave component to get ready to receive further information in the frame. This also allows any other slave components that are not to be communicated with to ignore the rest of the frame.

The next two clock cycles (corresponding to bits 18:17) are used to switch which component is asserting bits on the data wire. If the operation is an address or a write operation, the master component first transmits a logical one followed by a logical zero. If the operation is a read or a read increment operation, on the other hand, the master component lets the data wire float with a high impedance. This provides a transition cycle for the master component to release control of the data wire, and allows the slave component to drive the data wire with a logical zero in the following cycle thereby allowing the slave component to acquire control of the data wire.

If the operation is an address operation, the master component then indicates the address (corresponding to bits 16:01) that is to be operated on in a subsequent operation. If the operation is a write operation, the master component then writes the data (corresponding to bits 16:01) to an address specified in a previous address operation. If the operation is a read operation, the slave component then places the read data (corresponding to bits 16:01) from the previously specified address on the data wire. If the operation is a read increment operation, the slave component places the read data (corresponding to bits 16:01) for the next contiguous address on the data wire.

Regardless of the component is in control of the data wire, the component then lets the data wire float (corresponding to bit 00). This completes the frame.

The MDIO interface is effective in transferring data for the most part. However, the preamble is quite long and is about the same length as the rest of the frame. The length of the preamble is designed to be long so that if a slave component is communicating onto the data wire as when the slave component has lost synchronization with the master component, the slave component will be finished transmitting before the master component completes transmitting the preamble, and so that the slave components will recognize that the master component is transmitting a preamble. Accordingly, this length of the preamble is important to the operation of the MDIO interface. Nevertheless, the preamble is still quite long. Furthermore, the master component affirmative asserts the preamble on the data wire.

What would be advantageous is a two-wire interface (whether a guaranteed header two-wire interface or otherwise) that allows for a shorter preamble while retaining the ability to recover from a loss of synchronization. Furthermore, it would be advantageous if the two-wire interface reduced the amount of power needed to assert the preamble on the data wire.

BRIEF SUMMARY OF THE INVENTION

The foregoing problems with the prior state of the art are overcome by the principles of the present invention. The principles of the present invention may be implemented in a system that includes a master component and one or more slave components. The master component is configured to communicate with the slave component(s) over a data wire and a clock wire using a two wire interface.

The master component communicates over the data wire while enabling recovery of synchronization between the master component and the slave component(s). In particular, upon determining that an operation is to be performed on a slave component, the master component monitors the data wire for a predetermined number of consecutive bits having a particular binary value. Upon detection such a sequence, the master component asserts the remainder of the frame on the data wire. This detected predetermined number of consecutive bits will be considered to be the preamble. In one embodiment, the two-wire interface may be a guaranteed header two-wire interface. In other words, each byte or word (or other small fixed amount) of transferred data includes its own dedicated header information.

During at least some of the preamble phase, the master component is not asserting anything on the data wire. Instead, the data wire is pulled high by a weak pull-up resistor. Furthermore, the frame is designed so that there are bits having a guaranteed binary value that is opposite what would be expected in the preamble. Accordingly, if a slave component is out of synchronization with the master component, the slave components would assert these guaranteed values during the preamble phase, thereby causing the master component to start monitoring the data wire again for a preamble. On the other hand, if the master component does detect the predetermined number of consecutive bits on the data wire, then a slave component is not transmitting. Accordingly, it would then be safe for the master component to transmit. In this way, synchronization is achieved with a shorter preamble.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3B illustrates an example frame in which the operation is to write or read without using an extended field, and using CRC and acknowledgements;

FIG. 3C illustrates an example frame in which the operation is to write or read without using an extended field, and without using CRC and acknowledgements;

FIG. 7 illustrates a guaranteed header two-wire interface frame in accordance with the prior art.

DETAILED DESCRIPTION OF THE PREFERRED EMBODIMENTS

The principles of the present invention relate to a two-wire interface that has a short preamble that need not actually be physically asserted by a master component on the data wire of the two-wire interface. The shorter preamble is provided while still allowing for reliable recovery mechanisms in cases in which the master component loses synchronization with one or more of its slave components.

Figure 1:
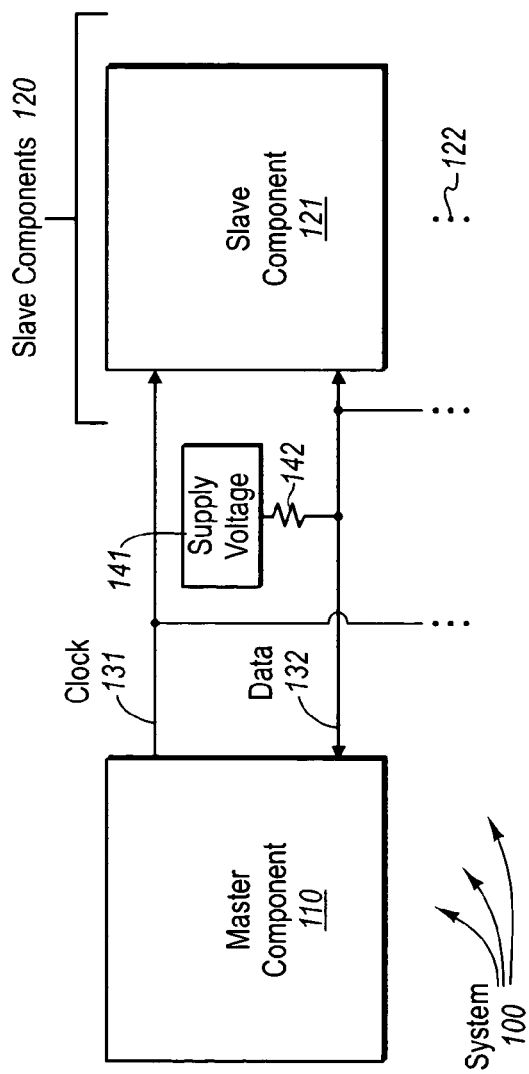
FIG. 1 illustrates an example of a system in which a master component communicates with one or more slave components over a two-wire interface that includes a clock wire and a data wire.

Turning to the drawings, FIG. 1 illustrates an electronic or computing system 100 in which a master component 110 is in communication with one or more slave components 120. The slave component(s) 120 include a slave component 121 amongst potentially any number of other slave components as represented by the vertical ellipses 122. The master component 110 communicates with any of the slave component(s) 120 over two wires including a clock wire 131 and a data wire 132.

The master component 110 is referred to as a "master" component because it asserts the clock signal on the clock wire 131 to thereby control the timing of each of the slave component(s) 120. In addition, the master component 110 identifies the operation to be performed by asserting signals on the data wire 132. The slave component(s) 120 are referred to as "slave" components since their timing is controlled by the master component 110, and since they are configured to comply with operations designated by the master component 110. When the master component 110 is to initiate an operation, the master components asserts the clock signal on the clock wire 131, and begins assertion of the frame on the data wire 132. Depending on the type of operation, the slave component 120 that is communicated with may be granted control of the data wire 132 to thereby communicate frame data on the data wire 132. In the following description, the slave component 120 that is communicated with will often be referred to as the slave component 121 although the master component 110 may elect to communicate with any of the slave component(s) 120.

Figure 2:
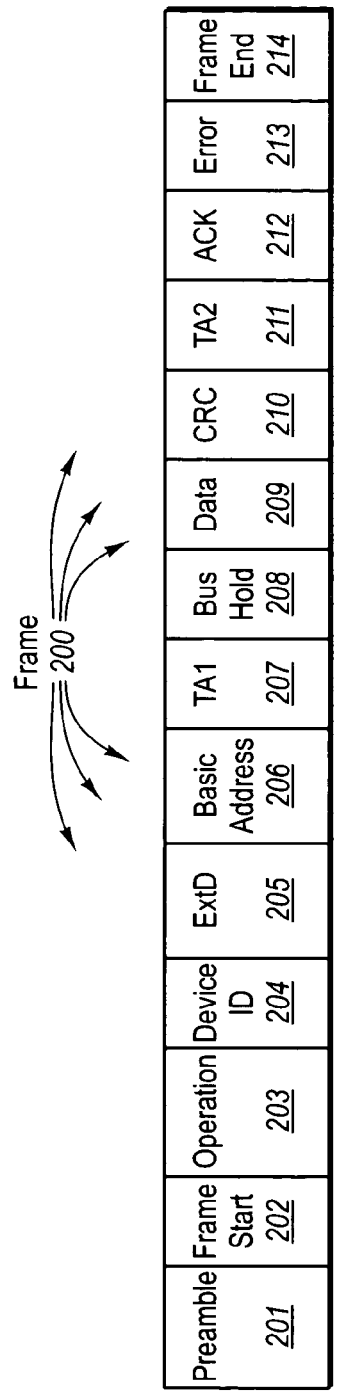
FIG. 2 schematically illustrates a sequential data structure of a frame that defines a guaranteed header two-wire interface in accordance with the principles of the present invention.

FIG. 2 illustrates a schematic diagram of a data structure 200 of a frame of a guaranteed header two-wire interface in accordance with the principles of the present invention. The frame 200 includes a preamble field 201, a frame start field 202, an operation field 203, a device identifier field 204, an optional extended field 205, a basic address field 206, a first bus turnaround field 207, and optional bus hold field 208, a data field 209, an optional Cyclic Redundancy Checking (CRC) field 210, a second bus turnaround field 211, an optional acknowledgement field 212, an optional error status field 213, and a frame end field 214. As will be explained in further detail below, the frame 200 is designed so that within any component's turn for control of the data wire, there is a guaranteed zero interspersed more frequently than the length of the preamble.

The bus turnaround fields allow for optional transfer of data wire control between the master component 110 and the slave component 121. Accordingly, the master component may be providing some of the frame, while the slave component may be providing other portions of the frame. Note that while a specific ordering of fields is shown in FIG. 2, there is considerable flexibility as to the ordering of the fields without adversely affecting the functionality of the frame 200 as will be apparent to those of ordinary skill in the art after having reviewed this description.

Figure 3A:
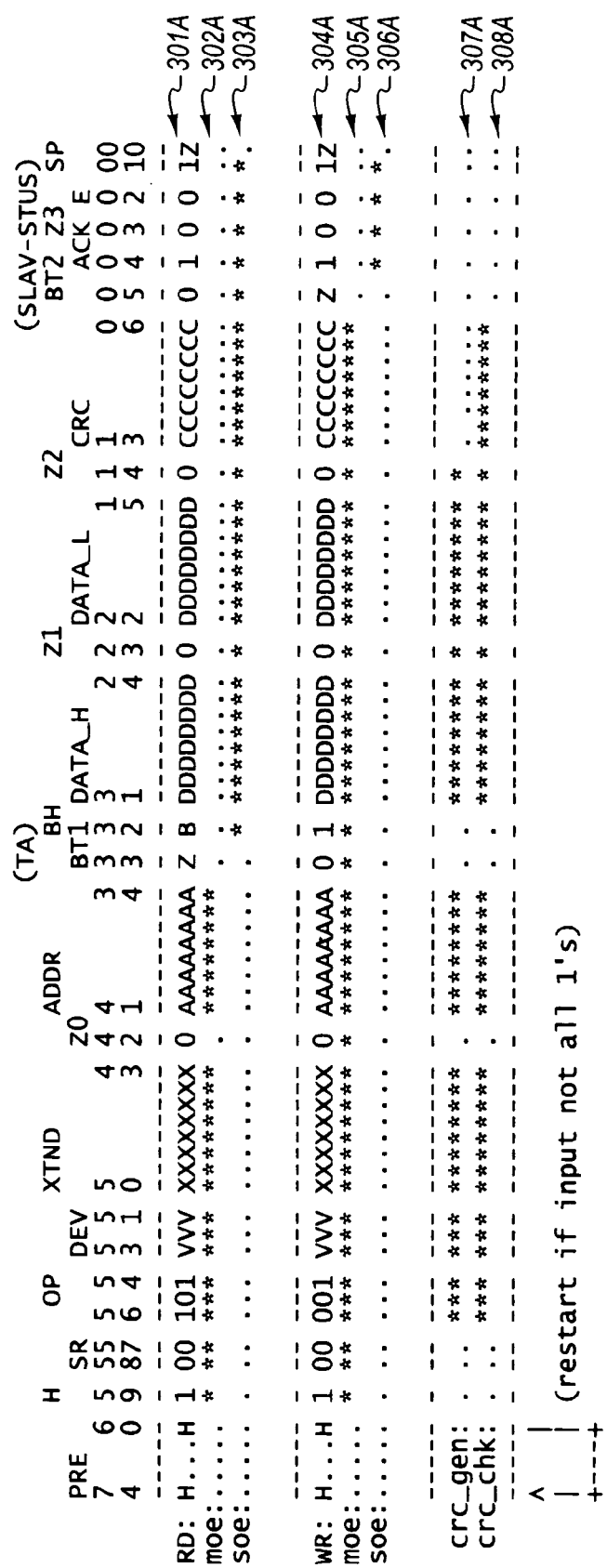
FIG. 3A illustrates an example frame in which the operation is to write or read using an extended field, and using Cyclic Redundancy Checking (CRC) and acknowledgements.

FIGS. 3A, 3B and 3C show specific embodiments of the frame 200. Some of the optional fields are included or excluded depending on the operation being performed. FIG. 3A illustrates an example frame in which the operation is to write or read using an extended field, and using Cyclic Redundancy Checking (CRC) and acknowledgements. FIG. 3B illustrates an example frame in which the operation is to write or read without using an extended field, and using CRC and acknowledgements. FIG. 3C illustrates an example frame in which the operation is to write or read without using an extended field, and without using CRC and acknowledgements.

Since FIG. 3A illustrates the most inclusive frame example, the various fields of the frame will be described in most detail with respect to FIG. 3A. The frame of FIG. 3A includes 75 bits corresponding to bits 74:0, regardless of whether the operation is a read operation as specified in line 301A or a write operation as specified in line 304A.

Line 302A illustrates an asterix at time increments when the master component 110 is in control of the data wire 132 during a read operation, and otherwise contains a period. "MOE" at the beginning of the line stands for "Master data Output Enable". Line 303A illustrates an asterix at time increments when the slave component 121 is in control of the data wire 132 during a read operation, and otherwise contains a period. "SOE" at the beginning of the line stands for "Slave data Output Enable".

Similarly, line 305A illustrates an asterix at time increments when the master component 110 is in control of the data wire 132 during a write operation, and otherwise contains a period. Furthermore, line 306A illustrates an asterix at time increments when the slave component 121 is in control of the data wire 132 during a write operation, and otherwise contains a period. Lines 307A and 308A will be explained further below.

The frame begins with a preamble as represented in FIG. 3A by the 15 bits 74:60. This preamble is an example of the preamble field 201 of FIG. 2. The data wire 132 is left in a high impedance state. Absent any assertion on the data wire 132 by master component 110 or any of the slave component (s) 120, the data wire 132 is held to a logical one by a weak pull-up resistor. For example, referring to FIG. 1, if the supply voltage 141 were a high supply voltage, the resistor 142 would be the pull-up resistor. When the master component 110 determines that a communication is to be made with slave component 121, the master component 110 generates a clock signal on the clock wire 131. At the same time, each clock cycle, the master component 110 monitors the data wire 132 for fifteen consecutive ones. The high impedance data wire 132 does allow for proper assertion of data on the data wire 132 despite the presence of the weak pull-up resistor.

If the master component 110 is not asserting anything on the data wire 132 during the preamble phase, then the data wire 132 should carry a logical one if none of the slave components is transmitting the remainder of a prior frame on the data wire 132. Alternatively, even if the master component 110 may be asserting a logical one on the data wire during at least some of the preamble, then the data wire 132 should still be carrying the logical one during the preamble phase assuming that none of the slave components is transmitting on the data wire 132 at that time. On the other hand, the frame is designed such that neither a master nor a slave transmits more than fifteen consecutive logical ones in a row when transmitting non-preamble portions of the frame.

Given the above, if the master component 110 detects a logical zero on the data wire 132 while monitoring the data wire 132 during the preamble phase of the frame, then a slave component is likely communicating on the data wire 132. Whether or not logical zeros are detected, the master component 110 will wait until there are fifteen cycles of logical ones on the data wire 132 before continuing with the frame. Due to the interspersed guaranteed zeros within the frame design, it is then that the master component 110 may safely transmit on the data wire 132 with little risk that one of the slave component(s) is also communicating on the data wire 132.

Accordingly, even if there is an error in synchronization between the master component 110 and the slave component 121, synchronization is reacquired as the master component 110 waits for the slave component 121 to complete its use of the data wire 132 before proceeding. The slave component 121 also monitors the data wire 132 for fifteen consecutive ones. Accordingly, when the slave component 121 encounters fifteen consecutive ones, the slave component 121 awaits the rest of the transmission. Accordingly, since the slave component 121 is not using the data wire 132 at the time of the preamble regardless of whether the slave component 121 had previously lost synchronization with the master component 110, the slave component should be listening for the preamble at the preamble phase of the frame. Accordingly, the slave component 121 reacquires synchronization with the master component 110.

Therefore, the preamble is significantly shortened while further retaining error recovery from loss of synchronization. Furthermore, since the data wire 132 is biased high due to the weak pull-up resistor, the master component need not assert any data on the data wire 132 during the preamble phase, thereby reducing power requirement. Additionally, the use of the weak pull-up resistor has the advantage of avoiding bus contention and potential electrical issues associated with both the master and slave simultaneously driving the data bus). Note that the preamble could be a sequence of logical zeros (instead of ones) with rest of the frame having interspersed guaranteed ones (instead of zeros), and with the resistor being a weak pull-down resistor, with the same effect. For example, referring to FIG. 1, if the supply voltage 141 were a low supply voltage, the resistor 142 would be the pull-down resistor. In the case of a pull-down resistor, the preamble and the bit 01 would all be logical zeros rather than logical ones as shown.

Once the preamble phase is completed (i.e., the master component 110 has detected at least fifteen consecutive binary ones on the data wire 132), the master component 110 asserts a logical one on the data wire as represented by bit 59. This turns on the output enable for the master component 110, and maintains the data wire 132 at the logical one for one more cycle.

The master component 110 then transmits two start of frame bits 58:57 which are guaranteed logical zeros. These start of frame bits are an example of the start of frame field 202 of FIG. 2. After the preamble phase is complete, the slave component(s) are listening for these logical zeros. When they arrive, the slave component(s) understand that the two logical zeros correspond to the start of the rest of the frame, thereby attaining synchronization. Two logical zeros are provided in order to provide sufficient statistical probability that the two logical zeros do indeed represent the start of a frame.

The master component 110 then transmits three operation code bits 56:54. These operation code bits are an example of the operation field 203 of FIG. 2. The three operation code bits would normally permit eight unique operations to be identified. However, in order to guarantee at least one logical zero in this operation code, the number of operations represented by the three bits is six, with the other two permutations of the operation code being reserved. In the illustrated example, bit sequences 011 and 111 are reserved.

In the example, operations bits 000 mean a write operation without using an extended field (explained further below), but with CRC checking and acknowledgements. A frame for this operation is shown in line 304B of FIG. 3B (see bits 47:45 of line 304B).

Operation bits 001 mean a write operation using an extended field, and with CRC checking and acknowledgments. A frame for this operation is shown in line 304A of FIG. 3A (see bits 56:54 of line 304A).

Operation bits 010 mean a write operation without using an extended field, and without CRC checking and acknowledgments. A frame for this operation is shown in line 304C of FIG. 3C (see bits 35:33 of line 304C).

Operations bits 100 mean a read operation without using an extended field, but with CRC checking and acknowledgements. A frame for this operation is shown in line 301B of FIG. 3B (see bits 47:45 of line 301B).

Operation bits 101 mean a read operation using an extended field, and with CRC checking and acknowledgments. A frame for this operation is shown in line 301A of FIG. 3A (see bits 56:54 of line 301A).

Operation bits 110 mean a read operation without using an extended field, and without CRC checking and acknowledgments. A frame for this operation is shown in line 301C of FIG. 3C (see bits 35:33 of line 301C).

Note how the structure of the frame differs depending on the operation. Accordingly, the master component 110 controls which frame structure is to be used by controlling the operation code. Upon reading the operation code, the slave component is configured to expect the frame structure corresponding to the operation code. Accordingly, the master component 110 may dynamically adjust the frame structure as needed. In times when bandwidth is more of a concern, the shorter and less reliable frame structure (e.g., FIG. 3C) may be used. In times when reliability is more of a concern, the longer and more reliable frames structure (e.g., FIGS. 3A and 3B) may be used. When further bits are needed for any reason, the frame with the extended field (e.g., FIG. 3A) may be used. When these further bits are not needed, the frames without the extended field (e.g., FIGS. 3B and 3C) may be used.

Referring back to FIG. 3A, after the master component 110 transmits the operation code (i.e., bits 56:54), the master component 110 transmits a three bit device identifier corresponding to bits 53:51. These device identifier bits are an example of the device identifier field 204 of FIG. 2. The device identifier identifies which slave component of the slave component(s) 120 that the master component 110 is to communicate with. Since three bits are used for the device identifier in this embodiment, there may be up to eight slave components in this embodiment (or seven slave components if the master component is to also have an address for self-diagnostic purposes).

Until the time that the device identifier bits are provided, each of the slave component(s) 120 was monitoring the communications over the data wire 132. However, upon receiving the device identifier bits, the slave component 121 may identify itself as corresponding to the device identifier. The other slave components, if any, may ignore the rest of the frame. Even though the other slave components ignore the rest of the frame, the other slave components may immediately continue monitoring the data wire 132 for another preamble indicative of another frame being transmitted. Alternatively, the other slave component may initiate such monitoring after clock signals are once again asserted on the clock wire 131 indicating that the next frame is about to begin.

After the master component 110 asserts the device identifier bits 53:51 on the data wire 132, the master component asserts eight bits 50:43 that correspond to an extended field. These extended bits are an example of the extended field 205 of FIG. 2. In the case of FIG. 3A, the operation code causes the slave component to expect these extended bits. The master component then transmits a guaranteed logical zero as bit 42 thereby ensuring that fifteen consecutive logical ones on the data wire 132 means that a frame is in the preamble phase to thereby support the above-described synchronization recovery mechanism.

The extended field may include any extended bits that are useful so long as the meaning of the bits is commonly recognized by both communicating components. For example, some or all of the extended field may represented an extended address for use when communicating with slave components having larger address spaces. Alternatively or in addition, some or all of the extended field may represent an extended operation code where more further operation types are desired.

The master component 110 then asserts eight bits 41:34 that correspond to the basic address. These eight bits 41:34 are an example of the basic address field 206 of FIG. 2. If all of the extended field represents an extended address, the slave component 121 may use all of the sixteen bits 50:43 and 41:34 to properly identify the address space that applies to the operation.

The next bit 33 in the frame is a first turnaround bit and represents an example of the first turnaround field 207 of FIG. 2. The turnaround bits are somewhat unique in that they allow for optional exchange of control of the data wire 132 between the master component 110 and the slave component 121.

In the case of a write operation, the first turnaround bit 33 is a logical zero, indicating that control is to stay for the time being with the master component. Accordingly, referring to line 305A of FIG. 3A, the master component 110 retains control of the data wire through the turnaround bit 33; and referring to line 306A of FIG. 3A, the slave component 121 does not gain control of the data wire through the turnaround bit 33. This retaining of control is appropriate since the master component 110 is the one that is providing that data that is the subject of a write operation initiated by the master component 110.

On the other hand, in the case of a read operation, the first turnaround bit 33 is a high-z, meaning that the data wire 132 is permitted to float at its high impedance state in which none of the master component 110 or slave component 121 is actively asserting bits on the data wire 132. This represents that control of the data wire has passed to the slave component (see lines 302A and 303A of FIG. 3A). This transfer of control is appropriate since the slave component 121 is the one that is providing that data that is the subject of a read operation initiated by the master component 110.

In the case of a read operation, the slave component 121 then has the opportunity to pause the frame in cases in which the slave component 121 is not ready to continue at this stage. The slave component asserts the bus hold bit 32 to a logical zero if it is not ready to continue. When ready to continue, the slave component 121 asserts a logical one if it is ready to proceed thereby giving the master component 110 notice that the slave component is ready to continue. This provides the slave component 121 with an option to pause the frame when the slave component is not ready to continue for the time being. An additional pausing option available to the slave component is described below with respect to the acknowledgement bit. In the case of a write operation, the bus hold bit 32 is a guaranteed logical one. The bus hold bit 32 is an example of the bus hold field 208 of FIG. 2.

In the case of a read operation, after the slave component 121 transmits the bus hold bit 32, the slave component 121 transmits the eight most significant bits followed by a guaranteed zero bit. In the case of a write operation, after the master component 110 transmits the bus hold bit 32, the master component 110 transmits the eight most significant bits followed by the guaranteed zero bit. In either case, the eight most significant bits are represented by bits 31:24, and the following guaranteed zero bit is represented by bit 23.

In the case of a read operation, after the slave component 121 transmits the guaranteed zero bit 23, the slave component 121 transmits the eight least significant bits followed by another guaranteed zero bit. In the case of a write operation, after the master component 110 transmits the guaranteed zero bit 23, the master component 110 transmits the eight least significant bits followed by the other guaranteed zero bit. In either case, the eight least significant bits are represented by bits 22:15, while the other guaranteed zero bit is represented by bit 14. The combination of the data bits 31:24 and 22:15 are an example of the data field 209 of FIG. 2.

In the case of a read operation, after the slave component 121 transmits the guaranteed zero bit 14, the slave component 121 transmits eight bits of Cyclic Redundancy Checking (CRC) data corresponding to bits 13:06. The CRC bits are one example of the CRC field 210 of FIG. 2. Using all the bits after the start of frame bits 58:57 and prior to the CRC bits 13:06, both the master component 110 and the slave component 121 calculate CRC data as shown in line 307A. When the master component 110 receives the CRC bits 13:06 back from the slave component 121, the master component 110 then compares the CRC information generated by both the master component 110 and the slave component 121 as represented by line 308A. If there is a mismatch, then there has likely been an error in transmission, and the master component may begin the frame again after the current frame is ended.

In the case of a write operation, after the master component 110 transmits the guaranteed zero bit 14, the master component 110 transmits the CRC bits 13:06. Once again, both the master component 110 and the slave component 121 calculate their CRC data. When the slave component 121 receives the CRC bits 13:06 from the master component 110, the slave component 121 then compares the CRC information generated by both the master component 110 and the slave component 121. If there is a mismatch, then there has likely been an error in transmission, and the master component 110 may begin the frame again after the current frame is ended after the master component 110 has been notified of the error. In some cases, an erroneous write operation may have catastrophic (or at least harmful) effects. For example, if the erroneous write operation was for setting a laser bias current, the laser strength could be too strong such that signal distortion occurs. Accordingly, reliable communications is important in such circumstances. The slave component 121 may elect to suppress a write operation when such an error is detected.

After the CRC bits 13:06, there is a second turnaround bit 05. This second turnaround bit is an example of the second turnaround field 211 of FIG. 2. This turnaround operation allows control of the data wire 132 to be given to the slave component 121 if control is not there already. This allows the slave component 121 to give reliability information back to the master component 110.

In the case of a read operation, control of the data wire 132 has already been passed to the slave component 121 using the first turnaround bit. Accordingly, this second turnaround bit is a logical zero indicating no change in control of the data wire 132. On the other hand, in the case of a write operation, control of the data wire 132 was not previously given to the slave component 121 using the first turnaround bit. Accordingly, the data wire 132 is allowed to float at its high impedance state indicating a transfer of control of the data wire 132 to the slave component 121. Accordingly, after the second turnaround bit 05, the slave component 121 has control of the data wire 110 regardless of whether the operation is a read operation or a write operation.

After the second turnaround bit 05, the slave component asserts an acknowledgment bit 04, which is an example of the acknowledgement field 212 of FIG. 2. This acknowledgement bit may represent whether or not the operation was successful. In this case, a logical one means successful completion of the operation. Had the slave component 121 been too busy to respond to the master component 110, the slave component may assert a logical zero for the acknowledgement bit 04, thereby forcing the master component 110 to reinitiate the frame. Accordingly, the acknowledgment bit 03, and the bit hold bit 32 provide a way for the slave component 121 to address the situation where it cannot respond to the request.

The slave component 121 then asserts a guaranteed zero bit 03, followed by an error bit 02, which is an example of the error field 213 of FIG. 2. The error field may indicate whether or not there was an error in CRC checking and/or a violation of the protocol (e.g., a logical one is detected where a logical zero should occur). In the case of a read operation, the master component will already be in possession of CRC data sufficient to make this determination. However, in the case of a write operation, the slave component 121 is the one that made the comparison of CRC data. Accordingly, it is at this time that the slave component 121 notifies the master component 110 of any mismatch in CRC data. A mismatch would result in the master component 110 reinitiating the frame. The presence of CRC and acknowledgment information in the frame allows for more reliable communication between the master component 110 and the slave component(s) 120.

The slave component 121 then asserts two end of frame bits 01:00, which indicates the end of the frame. The first bit 01 is a logical one, which forces the data bus immediately to a logical one. In the second bit, the data bus 132 is allowed to float at its high impedance state, ready for the next frame to begin. If the first bit 01 were a logical zero, it may take some time for the weak pull-up resistor to pull the data wire 132 up to a voltage level that could be interpreted as a logical one. Accordingly, the setting of the first bit 01 at a logical one means that the next frame may begin sooner, thereby improving performance.

FIG. 3B illustrates an example frame in which the operation is to write or read without using an extended field, and using CRC and acknowledgements. The frame of FIG. 3B is similar to that described above with respect to FIG. 3A, except that the operation is to write or read without using the extended field. Accordingly, bits 50:42 of FIG. 3A are absent from FIG. 3B and the bits are renumbered accordingly.

FIG. 3C illustrates an example frame in which the operation is to write or read without using an extended field, and without using CRC and acknowledgements. The frame of FIG. 3C is similar to that described above with respect to FIG. 3A, except that the operation is to write or read without using the extended field. Accordingly, bits 50:42 of FIG. 3A are absent from FIG. 3B. Furthermore, there is no reliability information within the frame. Hence, bits 13:02 of FIG. 3A are absence from FIG. 3C. The absence from FIG. 3C of bits that are present in FIG. 3A warrants the renumber of the remaining bits in FIG. 3C.

Figure 4:
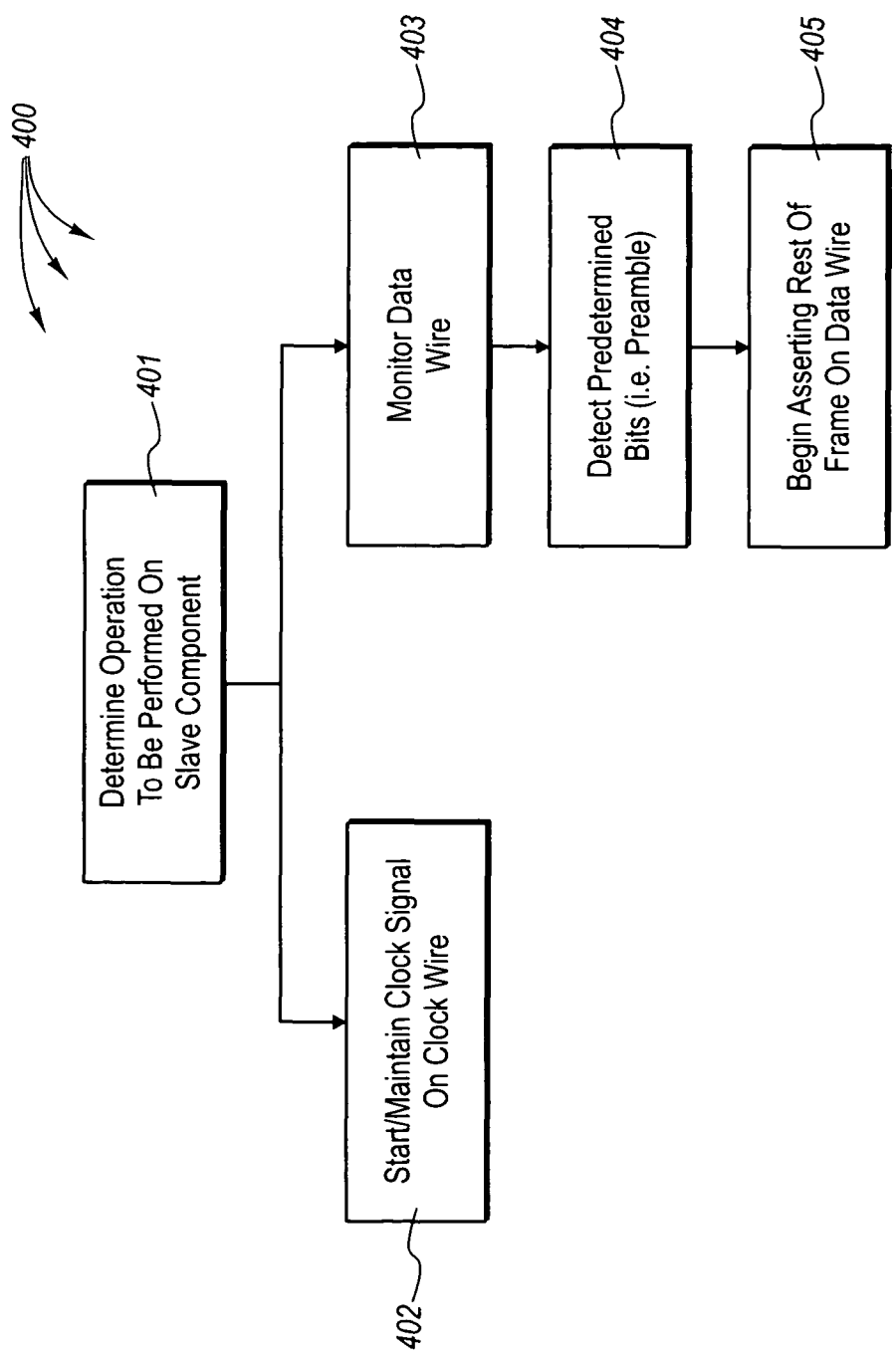
FIG. 4 illustrates a flowchart of a method for using a shorter preamble while enabling error recovery and while reducing power requirements in accordance with the principles of the present invention.

FIG. 4 illustrates a flowchart of a method 400 for using a shorter preamble while enabling error recovery and while reducing power requirements. While some aspects of this method have been described above, more specifics are now provided with respect to the flowchart.

The master component determines that an operation is to be performed on a slave component of the one or more slave components (act 401). As illustrated in FIGS. 3A through 3C, the operation may be a read or write operation, may include the use of an extended field, and may include communicating using reliability data such as, for example, cyclic redundancy checking data or acknowledgements.

The master component then starts asserting a clock signal on the clock wire (act 402). If the master component already was asserting such a clock signal, then that clock signal is maintained. At the same time, the master component monitors the data wire of the two-wire interface (act 403).

While monitoring, the master component detects that at least the predetermined number of consecutive bits of the same binary polarity have occurred on the data wire (act 404). This predetermined number of bits represents the previously mentioned preamble of the frame. If the predetermined number of bits is a logical one, then the data bus is normally pulled high by the weak pull-up resistor. If the predetermined number of bits is a logical zero, then the data bus is normally pulled low by a weak pull-down resistor. Either way, the preamble is asserted on the data wire without the master component needing to assert anything on the data wire. Accordingly, power is conserved. Upon detecting the preamble, the master component begins asserting the rest of the frame on the data wire (act 405).

The rest of the frame is designed so that there are bits having a guaranteed binary value that is opposite what would be expected in the preamble. These bits are interspersed throughout the frame such that it is guaranteed that there will never be the predetermined number of consecutive bits representative of the preamble on the data wire if another component is transmitting another portion of a frame on the data wire. Accordingly, if a slave component is out of synchronization with the master component, the slave components would assert these guaranteed values while the master component is monitoring for the preamble, thereby causing the master component to start monitoring the data wire again for a preamble. On the other hand, if the master component does detect the predetermined number of consecutive bits on the data wire, then a slave component is not transmitting. Accordingly, it would then be safe for the master component to transmit. In this way, synchronization is achieved with a shorter preamble. Having described the basic principles of the present invention, a particular example environment will now be described, although the present invention is not limited by any means to this example environment.

Figure 5:
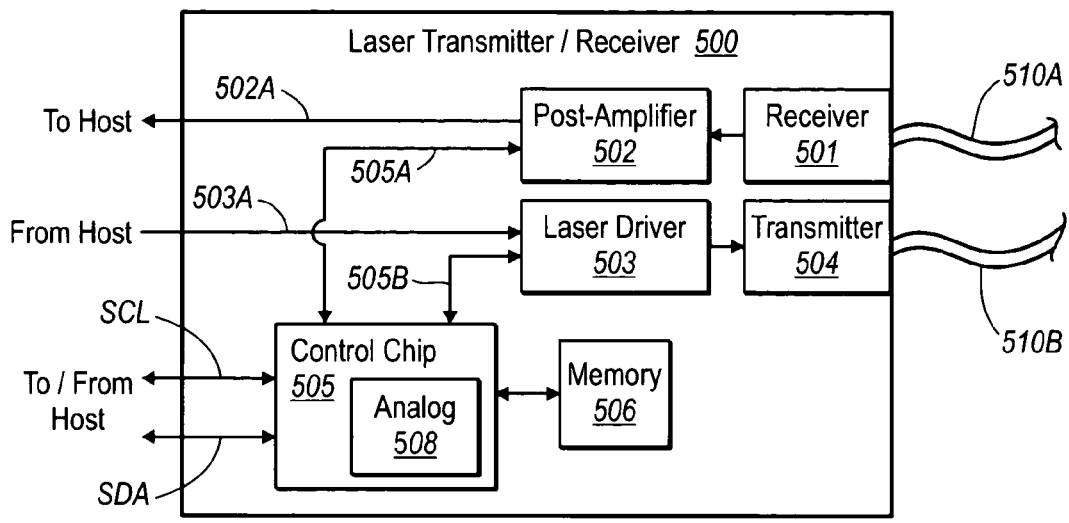
FIG. 5 illustrates a schematic diagram of a laser transmitter/receiver that represents one of many systems in which the principles of the present invention may be employed.

FIG. 5 illustrates a laser transmitter/receiver 500 in which the principles of the present invention may be employed. While the laser transmitter/receiver 500 will be described in some detail, the laser transmitter/receiver 500 is described by way of illustration only, and not by way of restricting the scope of the invention. The principles of the present invention allow for more efficient and accurate calibration of register values important to the operation of the transmitter/receiver 500 (such as laser bias current, laser modulation) to account for temperature, voltage supply, and process fluctuations. This will become increasingly important for faster bit rates transfers. Accordingly, the principles of the present invention are suitable for 1 G, 2G, 4G, 10G and higher bandwidth fiber channels. Furthermore, the principles of the present invention may be implemented in laser transmitter/receivers of any form factor such as XFP, SFP and SFF, without restriction The laser transmitter/receiver 500 receives an optical signal from fiber 510A using receiver 501. The receiver 501 transforms the optical signal to an electrical signal and provides that electrical signal to a post-amplifier 502. The post-amplifier 502 amplifies the signal and provides the amplified signal to the host as represented by arrow 502A.

The laser transmitter/receiver 500 may also receive electrical signals from the host for transmission onto the fiber 510B. Specifically, the laser driver 503 receives the electrical signal as represented by the arrow 503A, and drives the transmitter 504 (i.e., the laser) with signals that cause the transmitter 504 to emit onto the fiber 510B optical signals representative of the information in the electrical signal provided by the host.

The behavior of the receiver 501, the post-amplifier 502, the laser driver 503, and the transmitter 504 may vary dynamically due to a number of factors. For example, temperature changes, power fluctuations, and feedback conditions may each affect the performance of these components. Accordingly, the laser transmitter/receiver 500 includes a control chip 505, which evaluates temperature and voltage conditions, and receives information from the post-amplifier 502 (as represented by arrow 505A) and from the laser driver 503 (as represented by arrow 505B), which will allow the control chip 505 to counteract the dynamically varying performance, and detect when there is a loss of signal.

Specifically, the control chip 505 may counteract these changes by adjusting settings on the post-amplifier 502 and/or the laser driver 503 as represented by the arrows 505A and 505B. These settings adjustments are quite intermittent since they are only made when temperature or voltage or other low frequency changes so warrant. Accordingly, the setting adjustments may be made by a guaranteed header two-wire interface of the type described above with respect to FIGS. 1, 2, and 3A through 3C.

The control chip 505 has access to a non-volatile memory 506, which in one embodiment, is an Electrically Erasable and Programmable Read Only Memory (EEPROM). Data and clock signals may be provided from the host to the control chip 505 using the serial clock line SCL, and the serial data line SDA. Also data may be provided from the control chip 505 to the host using serial data signal SDA to allow for digital diagnostics and readings of temperature levels, transmit/receiver power levels, and the like.

The control chip 505 includes both an analog portion 508 and a digital portion. Together, they allow the control chip to implement logic digitally, while still largely interfacing with the rest of the laser transmitter/receiver 500 using analog signals. For example, the analog portion 508 may contain digital to analog converters, and analog to digital converters, high speed comparators (e.g., for event detection), voltage based reset generators, voltage regulators, voltage references, clock generator, and other analog components.

Figure 6:
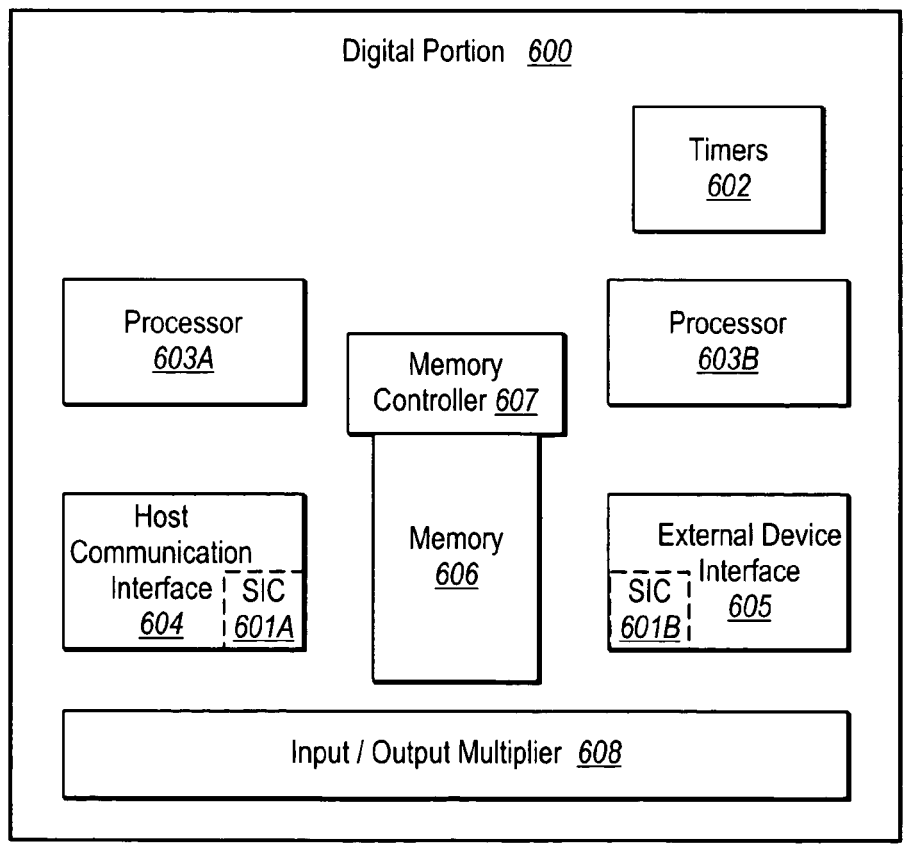
FIG. 6 illustrates a digital portion of the control chip illustrated in FIG. 5, the digital portion including a memory that includes the bit-wise accessible portion.

FIG. 6 illustrates the digital portion 600 of control chip 505 in further detail. For instance, a timer module 602 provides various timing signals used by the digital portion. Such timing signals may include, for example, programmable processor times. The timer module 602 may also act as a watchdog timer.

Two general-purpose processors 603A and 603B are also included. The processors recognize instructions that follow a particular instruction set, and may perform normal general-purpose operation such as shifting, branching, adding, subtracting, multiplying, dividing, Boolean operations, comparison operations, and the like. In one embodiment, the general-purpose processors 603A and 603B are each a 16-bit processor and may be identically structured.

A host communications interface 604 is used to communicate with the host using the serial clock line SCL and the serial data line SDA of the laser transmitter/receiver 500. The external device interface 605 is used to communicate with, for example, other modules within the laser transmitter/receiver 500 such as, for example, the post-amplifier 502, the laser driver 503, or the memory 506.

The memory 606 may be Random Access Memory (RAM). The memory control 607 shares access to the memory 606 amongst each of the processors 603A and 603B and with the host communication interface 604 and the external device interface 605. In one embodiment, the host communication interface 604 includes a serial interface controller 601A, and the external device interface 605 includes a serial interface controller 601B. The two serial interface controllers 601A and 601B may communicate using the two-wire interface described just above. One serial interface controller (e.g., serial interface controller 601B) being the master component, while the other serial interface controller (e.g., serial interface controller 601A) is a slave component.

An input/output multiplexer 608 multiplexes the various input/output pins of the control chip 505 to the various components within the control chip 505. This enables different components to dynamically assign pins in accordance with the then-existing operational circumstances of the chip. Accordingly, there may be more input\output nodes within the control chip 505 than there are pins available on the control chip 505, thereby reducing the footprint of the control chip 505.

Having described a specific environment with respect to FIGS. 5 and 6 in which the principles of the present invention described with respect to FIGS. 1, 2, 3A, 3B, 3C and 4 may be employed, it will be understood that this specific environment is only one of countless architectures in which the principles of the present invention may be employed. As previously stated, the principles of the present invention are not intended to be limited to any particular environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a system that includes a master component that is configured to communicate with one or more slave components over a clock wire and a data wire, a method for the master component to communicate over the data wire while enabling recovery of synchronization between the master component and the one or more slave components, the method comprising:
   determining that an operation is to be performed on a slave component of the one or more slave components;
   monitoring the data wire of the two-wire interface upon determining that the operation is to be performed on the slave component;
   detecting at least a predetermined number "n" of consecutive bits of the same binary polarity that have occurred on the data wire while monitoring the data wire, the predetermined number of consecutive bits comprising a preamble of a frame, the preamble being automatically asserted on the data wire without the master component or the slave component needing to affirmatively assert the preamble on the data wire;
   transmitting a three bit operational code designating an operation state and a structure of the frame;
   dynamically adjusting the structure of the frame based at least partially on bandwidth available; and
   transmitting non-preamble portions of the frame over the data wire with guaranteed bits unconditionally inserted in predetermined bit positions that are positioned at least every "n" consecutive bit positions in the non-preamble portions of the frame, each predetermined bit position being offset a predetermined number of consecutive bit positions from the last bit position of the preamble, the guaranteed bits being opposite in polarity with respect to the preamble bits' polarity.

2. A method in accordance with claim 1, wherein the two-wire interface is a guaranteed header two-wire interface.

3. A method in accordance with claim 1, wherein the two-wire interface is not a guaranteed header two-wire interface.

4. A method in accordance with claim 1, wherein detecting at least the predetermined number of consecutive bits comprises:
   detecting at least the predetermined number of consecutive bits of a logical one.

5. A method in accordance with claim 4, wherein the data wire is pulled high when no components are asserting binary values on the data wire.

6. A method in accordance with claim 1, wherein detecting at least the predetermined number of consecutive bits comprises:
   detecting at least the predetermined number of consecutive bits of a logical zero.

7. A method in accordance with claim 6, wherein the data wire is pulled low when no components are asserting binary values on the data wire.

8. A method in accordance with claim 1, further comprising:
   asserting, at the master component, a clock signal on the clock wire during at least some of the act of monitoring the data wire.

9. A method in accordance with claim 1, further comprising:
   asserting, at the master component, a voltage level on the data wire during only a portion of the act of monitoring the data wire.

10. A method in accordance with claim 9, wherein the data wire is pulled high when no components are asserting binary values on the data wire.

11. A method in accordance with claim 9, wherein the data wire is pulled low when no components are asserting binary values on the data wire.

12. A method in accordance with claim 1, further comprising:
    refraining from asserting, at the master component, a voltage level on the data wire while monitoring the data wire.

13. A method in accordance with claim 12, wherein the data wire is pulled high when no components are asserting binary values on the data wire.

14. A method in accordance with claim 12, wherein the data wire is pulled low when no components are asserting binary values on the data wire.

15. A method in accordance with claim 1, wherein determining that an operation is to be performed on a slave component of the one or more slave components comprises:
    determining that a read operation is to be performed with an extended address as compared to other frames communicated over the data wire.

16. A method in accordance with claim 1, wherein determining that an operation is to be performed on a slave component of the one or more slave components comprises:
    determining that a write operation is to be performed with an extended address as compared to other frames communicated over the data wire.

17. A method in accordance with claim 1, wherein determining that an operation is to be performed on a slave component of the one or more slave components comprises:
    determining that a read operation is to be performed with a shorter address as compared to other frames communicated over the data wire.

18. A method in accordance with claim 1, wherein determining that an operation is to be performed on a slave component of the one or more slave components comprises:
    determining that a write operation is to be performed with a shorter address as compared to other frames communicated over the data wire.

19. A method in accordance with claim 1, wherein determining that an operation is to be performed on a slave component of the one or more slave components comprises:
    determining that a read operation is to be performed with cyclic redundancy checking over the data wire.

20. A method in accordance with claim 1, wherein determining that an operation is to be performed on a slave component of the one or more slave components comprises:
    determining that a write operation is to be performed with cyclic redundancy checking over the data wire.

21. A method in accordance with claim 1, wherein determining that an operation is to be performed on a slave component of the one or more slave components comprises:
    determining that a read operation is to be performed with acknowledgements over the data wire.

22. A method in accordance with claim 1, wherein determining that an operation is to be performed on a slave component of the one or more slave components comprises:
    determining that a write operation is to be performed with acknowledgements over the data wire.

23. A method in accordance with claim 1, wherein the predetermined number "n" of consecutive bits is 15 bits.

24. A method in accordance with claim 1, further comprising determining, as a direct consequence of detecting the preamble on the data wire, that the slave component is not transmitting over the data wire and that it is safe for the master component to transmit over the data wire.

25. A method in accordance with claim 1, wherein the number of bits in the non-preamble portions of the frame is at least double the predetermined number "n" of bits in the preamble.

26. A method in accordance with claim 1, wherein the structure of the frame includes whether the frame includes an extended field.

27. A system comprising:
    a master component;
    a slave component;
    a clock wire interconnected between the master component and the slave component;
    a data wire interconnected between the master component and the slave component,
    wherein the master component is configured to perform:
       determining that an operation is to be performed on the slave component;
       monitoring the data wire of the two-wire interface upon determining that the operation is to be performed on the slave component;
       detecting at least a predetermined number "n" of consecutive bits of the same binary polarity that have occurred on the data wire while monitoring the data wire, the predetermined number of consecutive bits comprising a preamble of a frame;
       determining, as a direct consequence of detecting the preamble on the data wire, that the slave component is not transmitting over the data wire and that it is safe for the master component to transmit over the data wire;
       transmitting non-preamble portions of the frame over the data wire with guaranteed bits unconditionally inserted in predetermined bit positions that are positioned at least every "n" consecutive bit positions in the non-preamble portions of the frame, each predetermined bit position being offset a predetermined number of consecutive bit positions from the last bit position of the preamble, the guaranteed bits being opposite in polarity with respect to the preamble bits' polarity; and further transmitting in the non-preamble portions of the frame over the data wire an at least three bit operation code, wherein two permutations of the operation code are reserved to provide one of the guaranteed bits in the operation code.

28. A system in accordance with claim 27, wherein the two-wire interface is a guaranteed header two-wire interface.

29. A system in accordance with claim 27, wherein the two-wire interface is not a guaranteed header two-wire interface.

30. A system in accordance with claim 27, wherein the data wire is pulled high when no components are asserting binary values on the data wire.

31. A system in accordance with claim 27, wherein the data wire is pulled low when no components are asserting binary values on the data wire.

32. A system in accordance with claim 27, wherein the preamble is automatically asserted on the data wire without the master component or the slave component needing to affirmatively assert the preamble on the data wire.

33. A system in accordance with claim 27, wherein the number of bits in the non-preamble portions of the frame is at least double the predetermined number "n" of bits in the preamble.

34. A master component that is configured to do the following when coupled to a slave component via a clock wire and a data wire:
   determining that an operation is to be performed on the slave component;
   monitoring the data wire of the two-wire interface upon determining that the operation is to be performed on the slave component;
   detecting at least a predetermined number "n" of consecutive bits of the same binary polarity that have occurred on the data wire while monitoring the data wire, the predetermined number of consecutive bits comprising a preamble of a frame, the number of bits in the non-preamble portions of the frame being at least double the predetermined number "n" of bits in the preamble;
   transmitting an at least three bit operational code designating an operation state and a structure of the frame; and
   transmitting non-preamble portions of the frame over the data wire with guaranteed bits unconditionally inserted in predetermined bit positions that are positioned at least every "n" consecutive bit positions in the non-preamble portions of the frame, each predetermined bit position being offset a predetermined number of consecutive bit positions from the last bit position of the preamble, the guaranteed bits being opposite in polarity with respect to the preamble bits' polarity.

35. A master component in accordance with claim 34, wherein the two-wire interface is a guaranteed header two-wire interface.

36. A master component in accordance with claim 34, wherein the two-wire interface is not a guaranteed header two-wire interface.

37. A master component in accordance with claim 34, wherein the master component is implemented in a laser transmitter/receiver.

38. A master component in accordance with claim 37, wherein the laser transmitter/receiver is a 1G laser transceiver, a 2G laser transceiver, a 4G laser transceiver, a 10G laser transceiver, or a laser transceiver suitable for fiber channels greater than 10G.

39. A master component in accordance with claim 37, wherein the laser transmitter/receiver is an XFP laser transceiver, an SFP laser transceiver, or an SFF laser transceiver.

40. A master component in accordance with claim 34, wherein the preamble is automatically asserted on the data wire without the master component or the slave component needing to affirmatively assert the preamble on the data wire.

41. A master component in accordance with claim 34, wherein the master component is further configured to do the following when coupled to a slave component via a clock wire and a data wire: determining, as a direct consequence of detecting the preamble on the data wire, that the slave component is not transmitting over the data wire and that it is safe for the master component to transmit over the data wire.

* * * * *